United States Patent
Heinze

(10) Patent No.: US 6,378,295 B1
(45) Date of Patent: Apr. 30, 2002

(54) METHOD FOR CLEANING EXHAUST GAS WITH TRIMMING CONTROL

(75) Inventor: Thomas Heinze, Finnentrop (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/699,839

(22) Filed: Oct. 30, 2000

Related U.S. Application Data

(63) Continuation of application No. PCT/DE99/00784, filed on Mar. 19, 1999.

(30) Foreign Application Priority Data

Apr. 29, 1998 (DE) .................. 198 19 204

(51) Int. Cl.$^7$ ................................ F01N 3/00
(52) U.S. Cl. .................. 60/274; 60/276; 60/277; 204/421; 204/424
(58) Field of Search .............. 60/274, 276, 277, 60/285, 297; 204/421, 424, 425, 426; 205/781

(56) References Cited

U.S. PATENT DOCUMENTS

| | | | |
|---|---|---|---|
| 5,381,656 A | | 1/1995 | Orzel et al. |
| 5,499,500 A | | 3/1996 | Hamburg et al. |
| 5,554,269 A | * | 9/1996 | Joseph et al. .............. 204/424 |
| 5,596,448 A | | 1/1997 | Onaka et al. |
| 5,667,652 A | * | 9/1997 | Liu et al. .............. 204/412 |
| 5,686,654 A | * | 11/1997 | Friese et al. .............. 73/23.32 |
| 5,877,406 A | * | 3/1999 | Kato .............. 73/23.31 |
| 6,012,282 A | * | 1/2000 | Kato et al. .............. 60/274 |
| 6,301,878 B1 | * | 10/2001 | Zhang et al. .............. 60/274 |

FOREIGN PATENT DOCUMENTS

| DE | 35 00 594 C2 | 7/1986 |
|---|---|---|
| DE | 38 21 357 A1 | 2/1990 |

(List continued on next page.)

OTHER PUBLICATIONS

"Performance of Thick Film NOx Sensor on Diesel and Gasoline Engines" (Kato et al.), Society of Automotive Engineers, 1997, pp. 199–206.

(List continued on next page.)

*Primary Examiner*—Thomas Denion
*Assistant Examiner*—Binh Tran
(74) *Attorney, Agent, or Firm*—Herbert L. Lerner; Laurence A. Greenberg; Werner H. Stemer

(57) ABSTRACT

A method for controlling exhaust gas of an internal combustion engine includes controlling operation of the engine to fluctuate a lambda value of a raw exhaust gas at the lambda probe, exhibiting two-step action and disposed upstream of a three-way catalytic converter located in an exhaust tract, about a predetermined mean value. In a trimming controller, a concentration of an exhaust gas component downstream of the converter is measured with an amperometric-measuring sensor made from a solid-state electrolyte. In the sensor's first measuring cell, an oxygen concentration is measured through a first Nernst voltage between a first electrode and a reference electrode exposed to ambient air, and is controlled by a first oxygen-ion pumping current between the first electrode and an outer electrode of the sensor. In the second measuring cell of the sensor, the oxygen concentration is measured through a second Nernst voltage between the second and reference electrodes. A voltage is tapped between the outer and reference electrodes in conjunction with a series connection of the first and second measuring cells, and the voltage is used as a signal, dependent on the oxygen concentration and indicating two-step action, for trimming control. The predetermined mean values are corrected in dependence on the measured concentration of the exhaust gas component downstream of the converter. Preferably, the sensor is a $NO_x$-measuring sensor, and, in its second measuring cell, the oxygen concentration in the second measuring cell is controlled through a second oxygen-ion pumping current.

6 Claims, 2 Drawing Sheets

FOREIGN PATENT DOCUMENTS

| | | | |
|---|---|---|---|
| DE | 41 12 479 | A1 | 10/1992 |
| DE | 43 04 966 | A1 | 8/1994 |
| DE | 196 25 899 | A1 | 1/1998 |
| DE | 196 35 977 | A1 | 3/1998 |
| EP | 0 658 988 | A1 | 6/1995 |
| EP | 0 769 694 | A1 | 4/1997 |
| EP | 0 814 249 | A2 | 12/1997 |

OTHER PUBLICATIONS

"$ZrO_2$–Lambda Probes for Controlling the Fuel Mixture" (Wiedenmann et al.), Hanno Schaumburg, Sensor Applications, Stuttgart, 1995, pp. 370–399.

Patent Abstracts of Japan No. 04–359143 (Kazuo), dated Dec. 11, 1992.

Patent Abstracts of Japan No. 09–036814 (Haruki), dated Feb. 7, 1997.

* cited by examiner

METHOD FOR CLEANING EXHAUST GAS WITH TRIMMING CONTROL

CROSS-REFERENCE TO RELATED APPLICATION

This is a continuation of copending International Application PCT/DE99/00784, filed Mar. 19, 1999, which designated the United States.

BACKGROUND OF THE INVENTION

Field of the Invention

The invention relates to a method of cleaning the exhaust gas of an internal combustion engine.

In order to clean the exhaust gas of an internal combustion engine, a three-way catalytic converter is usually disposed in the exhaust tract of the engine. A lambda probe is provided upstream of the catalytic converter. An emitted voltage signal of the lambda probe is, as in the case of all lambda probes, dependent on residual oxygen contained in the exhaust gas. The residual oxygen component is dependent, in turn, onf a mixture that has been fed to the internal combustion engine. The residual oxygen component in the raw exhaust is lower for fuel excess (rich mixture), and higher for air excess (lean mixture). In the case of a lean mixture (lambda>1), the output voltage of the lambda probe is usually below 100 mV. The output voltage of the lambda probe changes virtually discontinuously in the region where lambda=1. Finally, the output voltage of the lambda probe reaches more than 0.8 V in the case of a rich mixture (lambda<1). Such output voltage range is denoted as two-step action. The internal combustion engine operates such that the output signal, reproducing the lambda value of the raw exhaust gas, of the lambda probe fluctuates about a predetermined mean value. Because a three-way catalytic converter exhibits optimum catalytic properties for a raw exhaust gas with lambda=1, the predetermined mean value should correspond to lambda=1.

However, the dynamic and static properties of the lambda probe upstream of the three-way catalytic converter undergo change through aging and poisoning. As a result, the mean value corresponding to the lambda=1 shifts its position. The prior art discloses locating a further lambda probe likewise exhibiting two-step action downstream of the three-way catalytic converter. The further lambda probe is used as a monitor probe to monitor the catalytic conversion and permits fine control of the mixture by correcting the predetermined mean value such that the lambda value most favorable for the conversion can always be observed. This method is denoted as guiding control or trimming control.

In addition to the three-way catalytic converter, a $NO_x$ catalytic converter is provided for further reducing the pollutant emissions of modern internal combustion engines. A $NO_x$-sensitive measuring sensor is present for optimally operating such a catalytic converter, which can, for example, be a storage catalytic converter that stores $NO_x$ in one operating state of the internal combustion engine and converts the stored NO, in another operating state.

SUMMARY OF THE INVENTION

It is accordingly an object of the invention to provide a method of cleaning the exhaust gas of an internal combustion engine that overcomes the hereinafore-mentioned disadvantages of the heretofore-known devices and methods of this general type and that makes it possible to dispense with a separate lambda probe disposed downstream of the catalytic converter while still retaining the ability of trimming control.

With the foregoing and other objects in view, there is provided, in accordance with the invention, a method of cleaning an exhaust gas of an internal combustion engine having a three-way catalytic converter disposed in an exhaust tract and a lambda probe disposed upstream of the three-way catalytic converter and exhibiting two-step action, including the steps of controlling operation of the internal combustion engine to fluctuate a lambda value of a raw exhaust gas at the lambda probe about a predetermined mean value, measuring, in a trimming controller, a concentration of an exhaust gas component downstream of the three-way catalytic converter with an amperometric measuring sensor made from a solid-state electrolyte and having a first measuring cell connected to a second measuring cell, a first electrode, a second electrode, an outer electrode, and a reference electrode exposed to ambient air, measuring, in the first measuring cell, an oxygen concentration through a first Nernst voltage between the first electrode and the reference electrode exposed to ambient air, and controlling, in the first measuring cell, the oxygen concentration by a first oxygen-ion pumping current between the first electrode and the outer electrode, measuring, in the second measuring cell, the oxygen concentration through a second Nernst voltage between the second electrode and the reference electrode, tapping a voltage between the outer electrode and the reference electrode in conjunction with a series connection of the first and second measuring cells, and using the voltage as a signal, dependent on the oxygen concentration and indicating two-step action, for trimming control and correcting predetermined mean values dependent on the measured concentration of the exhaust gas component downstream of the three-way catalytic converter.

According to the invention, there is provided, downstream of the three-way catalytic converter, an amperometric-measuring sensor, preferably, a $NO_x$ measuring sensor, for controlling a $NO_x$-reducing catalytic converter, and having two measuring cells. In conjunction with a series connection of the two measuring cells, the voltage between the outer electrode and the reference electrode of the amperometric measuring sensor is tapped, and a signal dependent on the oxygen concentration and indicating two-step action is obtained thereby. The signal indicating two-step action is used in a conventional way for trimming control. As a result, the operation of the prior art trimming control no longer requires a separate lambda probe, indicating two-step action, downstream of the catalytic converter.

In accordance with another mode of the invention, the amperometric-measuring sensor is a $NO_x$-measuring sensor and there is provided the step of controlling, in the second measuring cell of the $NO_x$-measuring sensor, the oxygen concentration in the second measuring cell through a second oxygen-ion pumping current.

In accordance with a further mode of the invention, there is provided the step of correcting the signal indicating two-step action dependent on the first oxygen-ion pumping current to compensate for a fault voltage caused by a contact resistance over which the first oxygen-ion pumping current flows.

In accordance with a concomitant mode of the invention, there is provided the step of correcting the signal depending on the oxygen concentration and indicating two-step action dependent on a temperature of the amperometric-measuring sensor.

Other features that are considered as characteristic for the invention are set forth in the appended claims.

Although the invention is illustrated and described herein as embodied in a method of cleaning exhaust gas with trimming control, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
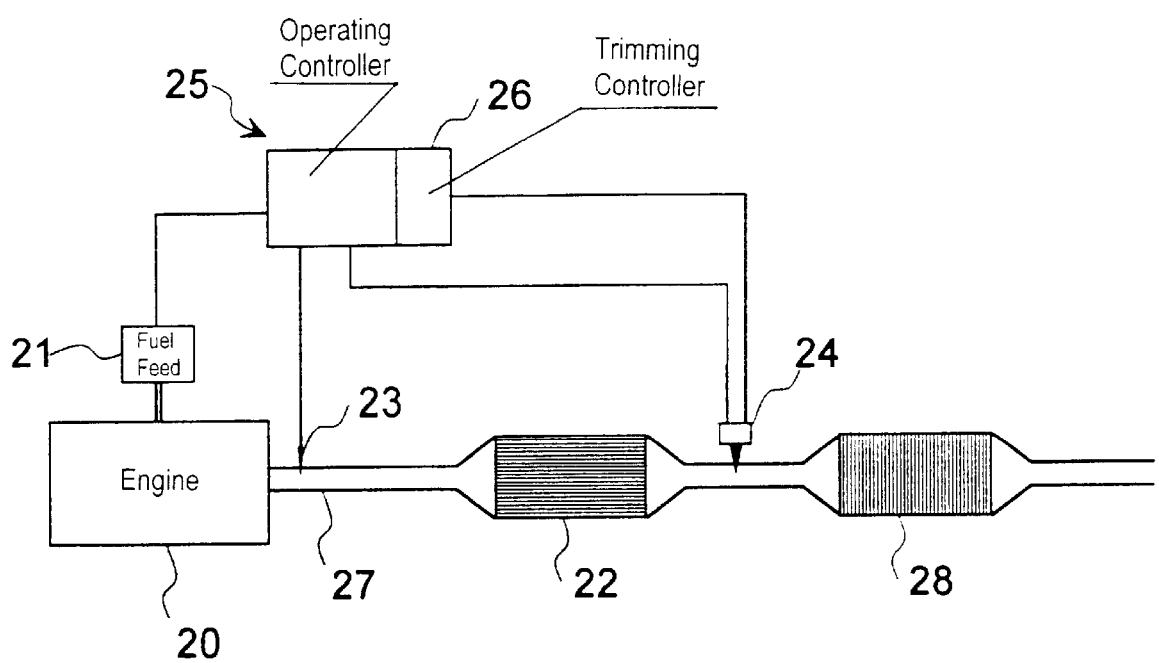
FIG. 1 is a block circuit diagram of a device for carrying out the method according to the invention.

In all the figures of the drawing, sub-features and integral parts that correspond to one another bear the same reference symbol in each case.

Referring now to the figures of the drawings in detail and first, particularly to FIG. 1 thereof, there is shown a device of cleaning the exhaust gas of an internal combustion engine 20. A lambda probe 23 is located in the exhaust gas or exhaust tract 27 of the internal combustion engine 20 upstream of a three-way catalytic converter 22.

The signal of the lambda probe 23 is fed to an operating controller 25 of the internal combustion engine 20, which controls a fuel feed system 21 such that the lambda value of the exhaust gas and the lambda probe 23 upstream of the three-way catalytic converter 22 executes an oscillation about lambda=1.

In order to carry out the conventional trimming control, which counterbalances a displacement (for example, due to age) of the mean value, corresponding to lambda=1, of the signal of the lambda probe 23, a trimming controller 26, which can be a separate unit or can be integrated in the operating controller 25, requires an oxygen-dependent signal, indicating a two-step action, from a measuring sensor disposed downstream of the three-way catalytic converter 22.

To accomplish such trimming control, the invention uses an amperometric measuring sensor that, in the case of FIG. 1, is a $NO_x$-measuring sensor 24, which is already present for the purpose of operating a $NO_x$-reducing catalytic converter 28 disposed downstream thereof. The $NO_x$-reducing catalytic converter 28 can also be disposed upstream of the $NO_x$-measuring sensor 24, or can be integrated into the three-way catalytic converter 22. As a result, there is no need for a separate lambda probe, which, in the prior art, is provided usually downstream of the three-way catalytic converter 22.

Figure 2:
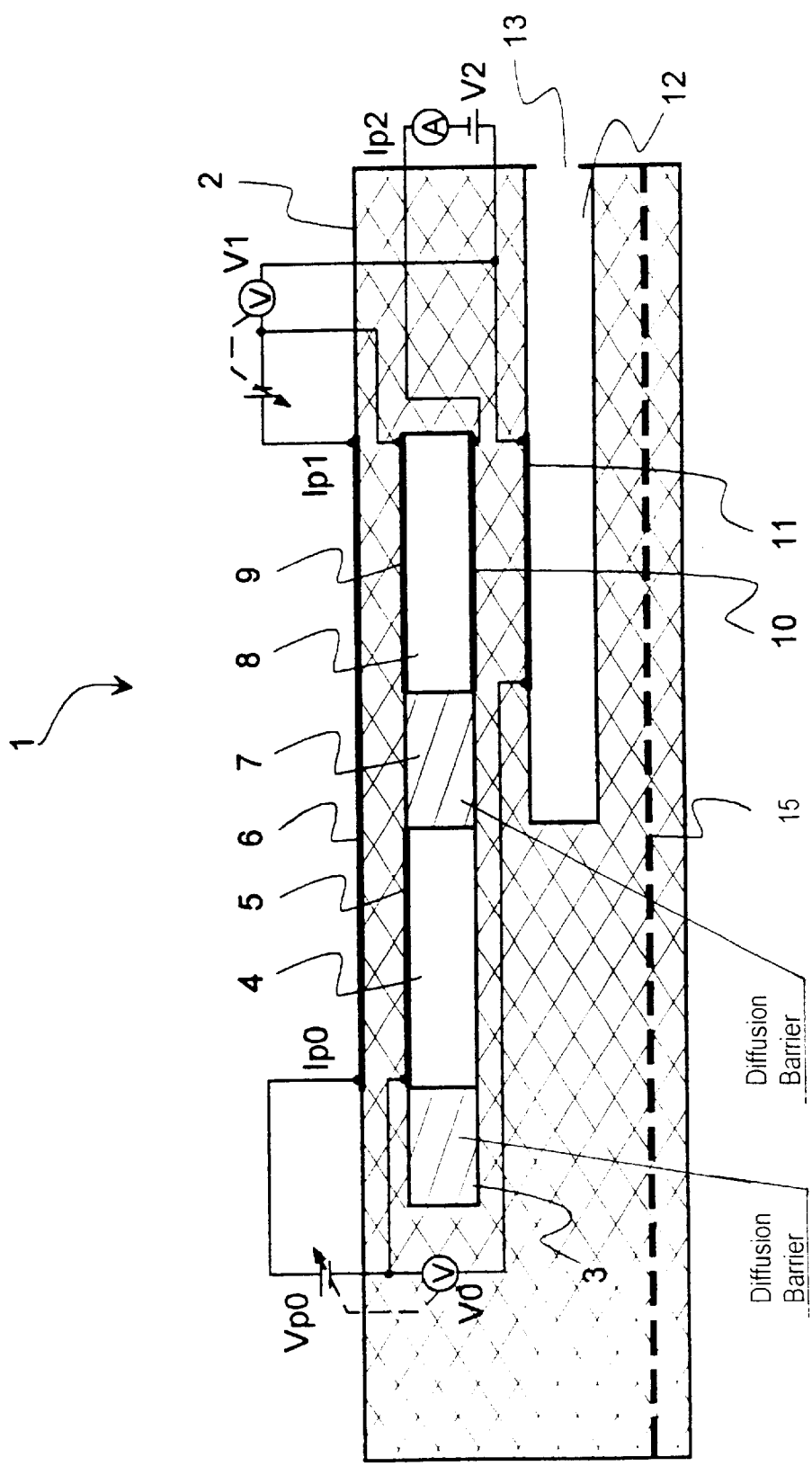
FIG. 2 is a block and schematic circuit diagram and a cross-sectional schematic of an amperometric-measuring sensor according to the invention.

Accordingly, the $NO_x$-measuring sensor 24 fulfills a double function. It supplies the operating controller 25 with a signal representing the $NO_x$ concentration, and supplies the trimming controller 26 with an oxygen-dependent signal indicating two-step action. The $NO_x$-measuring sensor 24 is illustrated schematically in detail in FIG. 2 as reference number 1. The sensor 24 includes a solid-state electrolyte 2, for example $ZrO_2$, and is fed the exhaust gas to be measured through a diffusion barrier 3. The exhaust gas diffuses through the diffusion barrier 3 into a first measuring cell 4.

The oxygen content in the first measuring cell 4 is measured by a first Nernst voltage V0 between a first electrode 5 and a reference electrode 11 exposed to ambient air. The electrode 5 can also be configured in a multipartite fashion or with several taps. Both electrodes are conventional platinum electrodes. The reference electrode 11 is disposed in an air duct 12 into which ambient air passes through an opening 13. The measured value of the first Nernst voltage V0 is used for setting a setting voltage Vp0. The setting voltage Vp0 drives a first oxygen-ion pumping current Ip0 through the solid-state electrolyte 2 between the first electrode 5 and an outer electrode 6. The control intervention, illustrated by a dashed line 15, of the first Nernst voltage V0 on the setting voltage Vp0 is such as to set the oxygen-ion-pumping current Ip0 such that a predetermined oxygen concentration is present in the first measuring cell 4.

The first measuring cell 4 is connected to a second measuring cell 8 through a further diffusion barrier 7. The gas present in the measuring cell 4 diffuses through the further diffusion barrier 7. Because of the diffusion, a correspondingly lower second oxygen concentration is set in the second measuring cell 8. The second oxygen concentration is measured, in turn, through a second Nernst voltage V1 between a second electrode 9, which is likewise a conventional platinum electrode, and the reference electrode 11, and is used to control a second oxygen-ion-pumping current Ip1. The second oxygen-ion pumping current Ip1 from the second measuring cell 8 flows from the second electrode 9 through the solid-state electrolyte 2 to the outer electrode 6. With the aid of the second Nernst voltage V1, the second oxygen-ion-pumping current Ip1 is controlled such that a predetermined low, second oxygen concentration is present in the second measuring cell 8.

The $NO_x$ not affected by the previous operations in the measuring cells 1 and 2 is now decomposed under application of the voltage V2 at the measuring electrode 10, which is configured to be catalytically active, and the liberated oxygen is pumped towards the reference electrode 11 as a measure of the $NO_x$ concentration of the measuring cell 8, and is, thus, pumped in a third oxygen-ion pumping current Ip2 in the exhaust gas to be measured.

The following voltage is produced in the first measuring cell $$U_{first\ measuring\ cell} = RT/(4F) \cdot (\ln P_{O2,\ first\ measuring\ cell} - \ln P_{O2,\ exhaust\ gas}) + R0 \cdot Ip0 \qquad (I)$$

Where $P_{O2,\ first\ measuring\ cell/exhaust\ gas}$ is the oxygen partial pressure in the first measuring cell or the exhaust gas, respectively, R is the gas constant, T is the absolute gas temperature, F is the Faraday constant, R0 is a contact resistor between the first electrode 5 and the solid-state electrolyte 2, and Ip0 is the first oxygen-ion pumping current.

The following voltage is produced in the second measuring cell:

$$U_{second\ measuring\ cell} = RT/(4F) \cdot (\ln P_{O2,\ ambient\ air} - \ln P_{O2, second\ measuring\ cell}) \qquad (II)$$

Where $P_{O2}$, ambient air/second measuring cell is the oxygen partial pressure in the ambient air or the second measuring cell, respectively.

The two measuring cells 4 and 8 are connected in series by tapping the differential voltage between the outer electrode 6 and the reference electrode 11, thus producing to a first approximation the following relationship at the taps of the inner electrode 5, in conjunction with an adequately homogeneous temperature of the measuring sensor 1, an adequately low current Ip0 and an adequately identical oxygen partial pressure:

$$U_{two\ point} = RT/(4F) \cdot (\ln P_{O2, ambient\ air} - \ln P_{O2, second\ measuring\ cell} + \quad \text{(III)}$$
$$\ln P_{O2, first\ measuring\ cell} - \ln P_{O2, exhaust\ gas})$$
$$= RT/(4F) \cdot (\ln P_{O2, ambient\ air} - \ln P_{O2, exhaust\ gas})$$

This relationship describes the two-step action of a lambda probe. Consequently, the differential voltage between the outer electrode 6 and the reference electrode 11 can be used as the above mentioned signal indicating two-step action, which replaces the signal, commonly used in the prior art, of a post-cat lambda probe.

The measuring error, caused in the equation I by the contact resistance R0, in the case of the voltage at the first measuring cell 4 can advantageously be corrected by assuming a specific resistance value and carrying compensation dependent on Ip0. Furthermore, the signal can be corrected preferably with regard to the temperature of the measuring sensor.

In a further embodiment of the method according to the invention, a non-illustrated oxygen-dependent broadband lambda probe is used for trimming control. Such a broadband lambda probe is disclosed, for example, from H. Schaumburg (Pubs.), "Sensoranwendungen" ["Sensor Applications"], Chapter "ZrO$_2$-Lambdasonden für die Gemischregelung im Kraftfahrzeug" ["ZrO$_2$-Lambda Probe for Mixture Control in Motor Vehicles"], B. G. Teubner, Stuttgart, 1995, and is incorporated herein by reference. Therefore, the broadband lambda probe is not described in any greater detail. In the case of such a probe, as well, a signal dependent on the oxygen concentration and indicating two-step action can be obtained for the trimming control by tapping the differential voltage between the outer electrode and the reference electrode.

I claim:

1. A method of cleaning an exhaust gas of an internal combustion engine having a three-way catalytic converter disposed in an exhaust tract and a lambda probe disposed upstream of the three-way catalytic converter and exhibiting two-step action, which comprises:

controlling operation of the internal combustion engine to fluctuate a lambda value of a raw exhaust gas at the lambda probe about a predetermined mean value;

measuring, in a trimming controller, a concentration of an exhaust gas component downstream of the three-way catalytic converter with an amperometric measuring sensor made from a solid-state electrolyte and having a first measuring cell connected to a second measuring cell, a first electrode, a second electrode, an outer electrode, and a reference electrode exposed to ambient air;

measuring, in the first measuring cell, an oxygen concentration through a first Nernst voltage between the first electrode and the reference electrode exposed to ambient air, and controlling, in the first measuring cell, the oxygen concentration by a first oxygen-ion pumping current between the first electrode and the outer electrode, and measuring, in the second measuring cell, the oxygen concentration through a second Nernst voltage between the second electrode and the reference electrode;

tapping a voltage between the outer electrode and the reference electrode in conjunction with a series connection of the first and second measuring cells, and using the voltage as a signal, dependent on the oxygen concentration and indicating two-step action, for trimming control; and correcting predetermined mean values in dependence on the measured concentration of the exhaust gas component downstream of the three-way catalytic converter.

2. The method according to claim 1, wherein the amperometric measuring sensor is a NO$_x$-measuring sensor and which comprises controlling, in the second measuring cell of the NO$_x$-measuring sensor, the oxygen concentration in the second measuring cell through a second oxygen-ion pumping current.

3. The method according to claim 1, which further comprises correcting the signal indicating two-step action in dependence on the first oxygen-ion pumping current to compensate for a fault voltage caused by a contact resistance over which the first oxygen-ion pumping current flows.

4. The method according to claim 2, which further comprises correcting the signal indicating two-step action in dependence on the first oxygen-ion pumping current to compensate for a fault voltage caused by a contact resistance over which the first oxygen-ion pumping current flows.

5. The method according to claim 1, which further comprises correcting the signal depending on the oxygen concentration and indicating two-step action in dependence on a temperature of the amperometric measuring sensor.

6. The method according to claim 2, which further comprises correcting the signal depending on the oxygen concentration and indicating two-step action in dependence on a temperature of the NO$_x$-measuring sensor.

* * * * *